Oct. 4, 1955　　　　　P. C. JURS　　　　2,719,644
FILLER DOME ASSEMBLY
Filed Feb. 24, 1953　　　　　　　　3 Sheets-Sheet 2
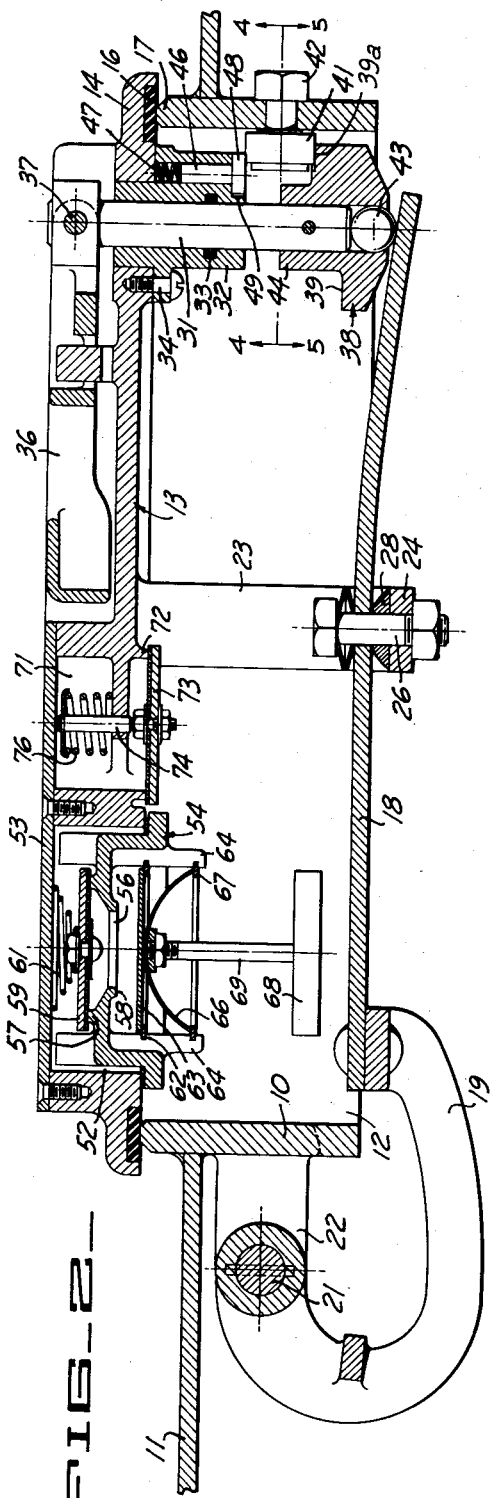
INVENTOR.
Peter C. Jurs
BY
ATTORNEYS

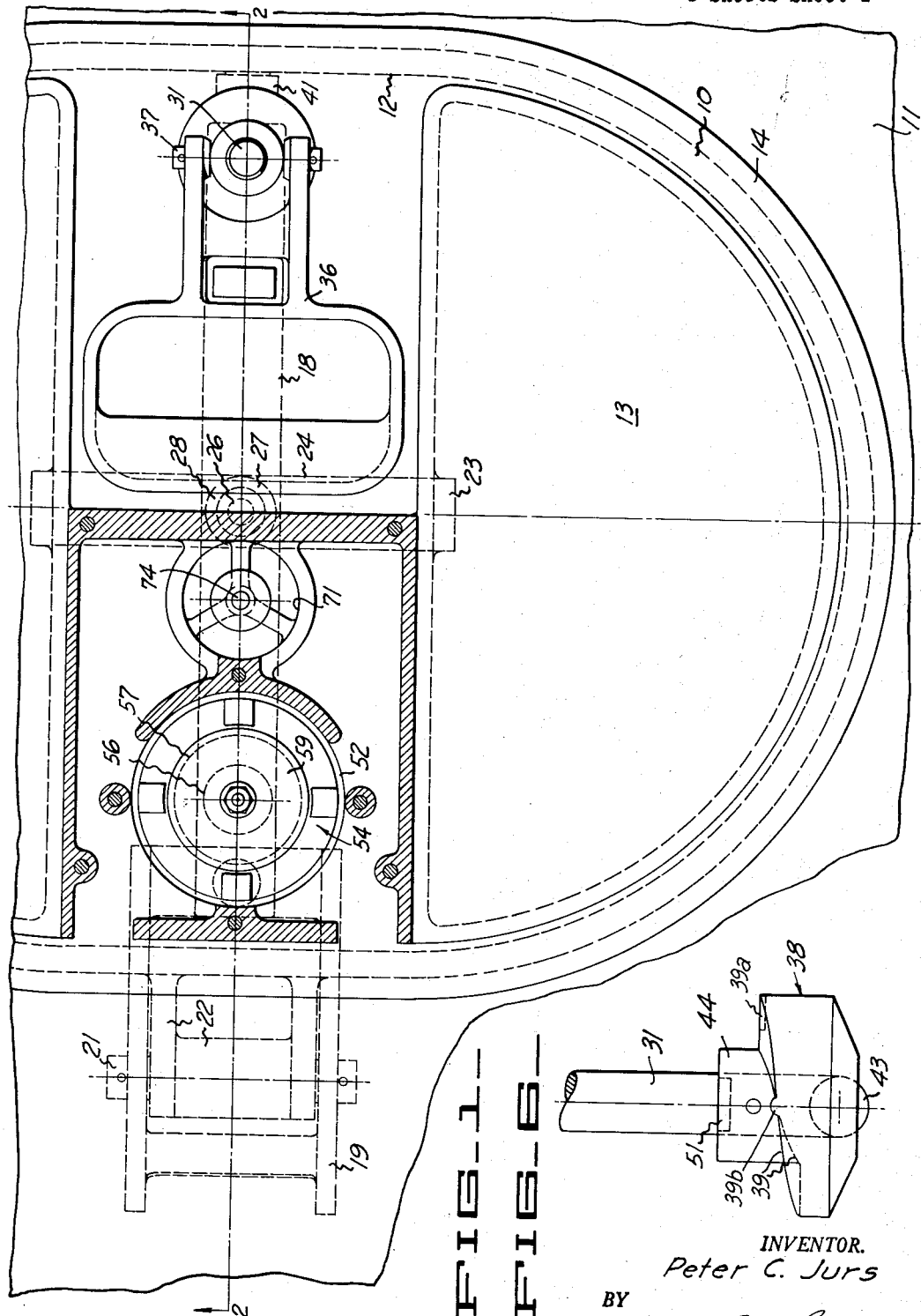

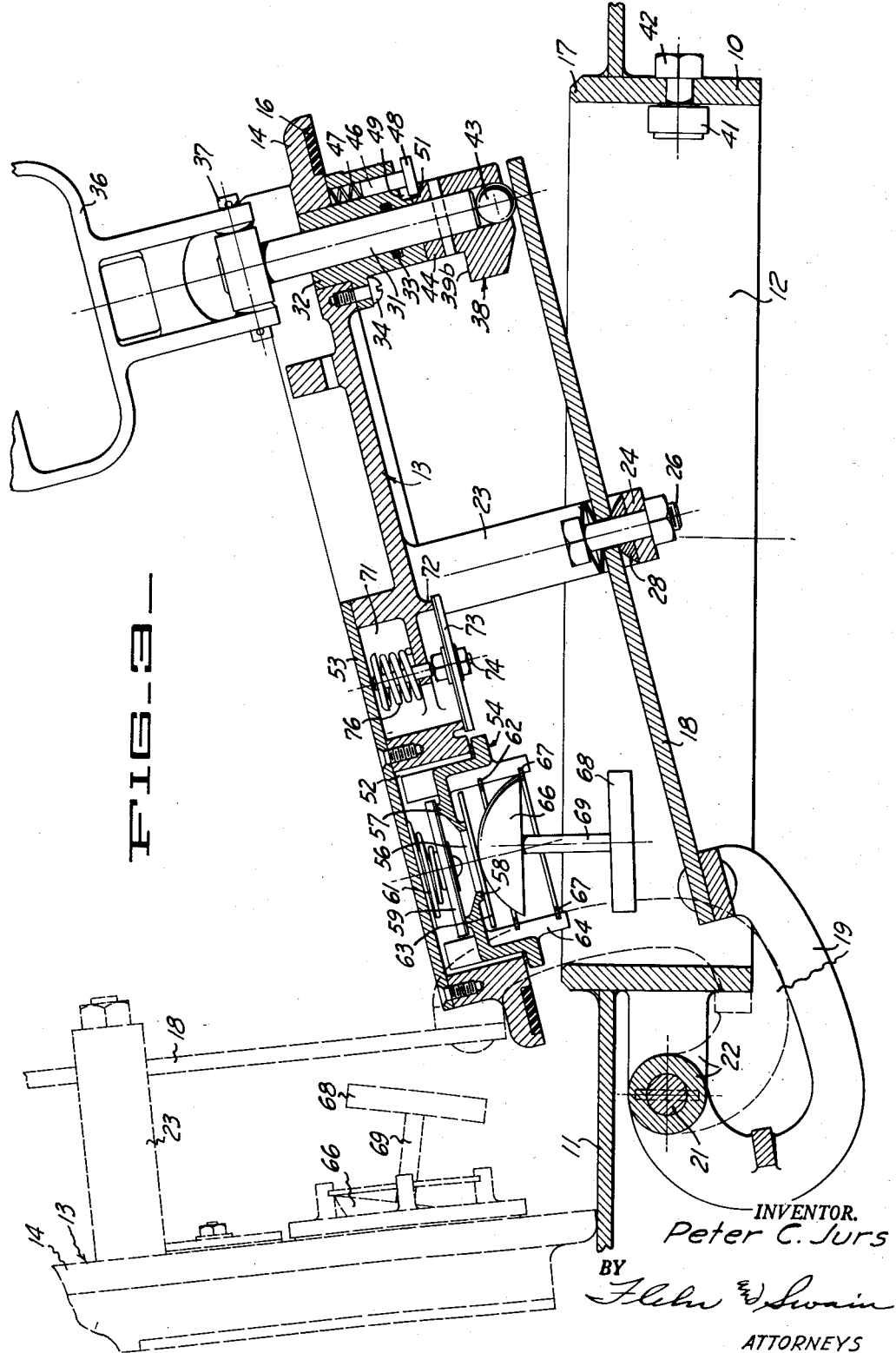

United States Patent Office 2,719,644
Patented Oct. 4, 1955

2,719,644

FILLER DOME ASSEMBLY

Peter C. Jurs, Oakland, Calif., assignor, by mesne assignments, to Shand and Jurs Company, Berkeley, Calif., a corporation of California Application February 24, 1953, Serial No. 338,423

4 Claims. (Cl. 220—25)

This invention relates generally to assemblies suitable for mounting in one wall of a tank to form what is commonly referred to as a filler dome.

Filler dome assemblies such as are used with tanks for the transportation or storage of volatile and inflammable liquids, like gasoline, are subject to various hazards and severe operating conditions. For example, abnormal pressure or vacuum conditions may require venting through the dome, and relatively extreme pressures may require temporary unseating of the dome cover. An accident may tilt the tank, or may roll it over, with the possibility of spillage of liquid through mechanical breakage or inability to maintain a liquid seal. Because of such hazards filler dome assemblies such as have been used in the past have been equipped with means for relieving abnormal internal pressure or vacuum conditions, and an arrangement permitting the cover to open in the event a dangerously high pressure is developed in the tank. However, such assemblies have not been entirely satisfactory, particularly with respect to mechanical construction and operating characteristics.

It is an object of the present invention to provide a dome assembly of the above character having improved means for locking and yieldably retaining the cover in closed position, whereby it may be forced open by relatively high tank pressure.

A further object of the invention is to provide such a dome assembly with improved means for preventing leakage of liquid through pressure venting means provided in the cover of the dome, when the tank is turned over or tilted beyond a given angle.

Another object of the invention is to provide a filler dome with an improved mechanical structure and assembly whereby mechanical parts are protected against breakage in the event the tank rolls over upon the ground.

Another object of the invention is to provide a filler dome assembly having improved means for locking the cover in normal closed position.

Another object of the invention is to provide a dome assembly with improved means for yieldably retaining the cover upon its associated seat.

Further objects are to provide a filler dome which has an opening of sufficient size to permit use of a large fill pipe and to serve as a manhole, and to provide an assembly of this character which can be installed on relatively narrow tanks or compartments and which has a relatively low silhouette.

Additional objects and features of this invention will appear from the following description in which the preferred embodiment has been set forth in detail in conjunction with the accompanying drawing.

Referring to the drawing:

Figure 1 is a partial plan view illustrating a filler dome assembly in accordance with the present invention.

Figure 2 is a cross-sectional view taken along the line 2—2 of Figure 1.

Figure 3 is a view similar to Figure 2, but showing the cover swung upwardly toward open position.

Figure 4 is an enlarged detail showing the means employed for preventing turning of the locking rod except when the cover is in closed position, and taken along the line 4—4 of Figure 2.

Figure 5 is an enlarged cross-sectional detail taken along the line 5—5 of Figure 2.

Figure 6 is a detail illustrating the cam incorporated in the cover locking means.

The dome assembly illustrated particularly in Figures 1 and 2 consists of a body 10 which is adapted to be mounted within a tank wall 11. The body provides an opening 12 to the interior of the tank, and this opening may be oval, as illustrated in Figure 1. Assuming installation in connection with a truck tank, the body is installed in the upper wall of the tank, whereby it is normally substantially horizontal. A cover 13 is disposed to close upon the top of the body, and is provided with venting means as will be presently described. The peripheral margin 14 of the cover is provided with an insert 16 of suitable material, such as synthetic rubber, which is adapted to seat upon and seal with respect to the seating surface 17, formed upon the upper face of the body.

Below the lower or inner side of the cover 13, there is a leaf spring 18 formed of suitable material such as spring steel. One end of the leaf spring is attached to the arms 19, and these arms in turn are carried by the horizontal pivot pin 21. This pin is journaled by the ears 22 which extend laterally from one side of the body 10.

An intermediate portion of the spring 18 is attached to the cover 13. Thus a yoke 23 is secured to the under side of the cover and the cross bar 24 of this yoke carries the retaining bolt 26. The spring is apertured to receive the retaining bolt 26, and the lower face of the spring is engaged by the fulcrum bar 28. The bar 28 can have one convex side as illustrated, to facilitate self-aligning action between the yoke 23 and the spring.

That edge portion of the cover which is remote from the pivot pin 21 is provided with means for releasably locking the cover to the body. As illustrated this means consists of a rotatable rod 31 which extends through the sleeve 32, and is sealed with respect to the same by suitable means such as the resilient O-ring 33. The sleeve is mounted within the cover by suitable means such as screws 34. The exterior end of the rod 31 is secured to a suitable operating handle 36, preferably by the pivot connection 37 whereby the operating handle can be raised to an operating position, or swung down to an out-of-the-way position, as illustrated in Figure 2. A cam 38 is attached to the inner end of the rod 31, and is provided with a generally helicoidal cam face 39. This cam face is adapted to engage a roller 41, which is mounted on the adjacent portion of the body by suitable means such as the screw 42. The cam 38 is interrupted as illustrated in Figure 5, whereby for one operating position the cam may be lifted to pass the roller 41, and thus permit the cover to swing to open position. The cam face 39 is provided with a detent recess 39a and a detent ridge 39b. The recess is engaged by roller 41 for locked position of the cam, and the ridge engages the roller to provide a pause while turning the cam toward unlocked position, during which pause any tank pressure is dissipated.

Means is provided whereby when the rod 31 is returned to cause the cam 38 to engage roller 41, tension is simultaneously applied to the leaf spring 18. Thus, a suitable thrust transmitting member, such as a ball 43, is carried by the cam 38 immediately below the rod 31, and is adapted to engage the adjacent free end of the spring 18.

With the arrangement just described, when the cover is locked to the body and the handle 36 is in an out-of-the-way position, as illustrated in Figure 2, the leaf spring 18 is maintained tensioned, and the tension is applied to urge the cover downwardly into tight sealed engagement with the body. When the handle 36 is raised and the rod 31 turned in a direction to disengage the cam 38 from the roller 41, the initial part of such rotation relieves the tension on spring 18, and at the same time such relief in tension is accompanied by a raising of the cam 38 toward the sleeve 32. After rotation through sufficient angle of say about 270°, spring tension is completely relieved and the cover can be swung to open position. The positioning of the parts at that time is illustrated in Figure 3. Note that the hub 44 of the cam 38 has been translated into abutment with the lower end of the sleeve 32.

In connection with the cover locking means just described, means is preferably employed for locking the rod 31 and the cam 38 against rotation, while the cover is in open position. Thus, a pin 46 is slidably mounted adjacent one side of the sleeve 32, and normally urged toward projected position by the compression spring 47. The head 48, which is mounted on the lower end of pin 46, is adapted to be accommodated within the notch or recess 49 formed in the lower end of the sleeve 32, or in a similar notch 51 which is formed in the upper face of the hub 44. The notches 49 and 51 are in registry when the cam is in fully released position, and the cover is fully or partly opened, as illustrated in Figure 3. Thus, under such conditions, interlocking action between the head 48 and the cam 38 prevents rotation of the handle 36 and the rod 31. When the cover is swung downwardly upon the body, preparatory to locking it in closed position, one side of the head 48 engages the upper side of the roller 41, and thus the pin 46 is thereby retracted into the notch 49 to leave the cam 38 free for rotation.

It is desirable to provide the cover with venting means to relieve abnormal internal pressure. Thus, one part of the cover is provided with an opening 52 which normally is covered by the plate 53, and which serves to accommodate the fitting 54. The fitting 54 is sealed with respect to the cover and it is formed to provide the vent opening or passage 56. Annular valve seats 57 and 58 surround the passage 56, and are faced upwardly and downwardly respectively. The valve seat 57 cooperates with a valve member or disc 59, which is urged toward closed position by the compression spring 61. The compression spring 61 is of such strength that a predetermined pressure above atmospheric within the tank causes the disc 59 to be moved away from the seat 57, to permit vapor to vent from the tank.

Below the downwardly faced seat 58, the fitting 54 carries an annular shoulder or ledge 62, which serves to support the valve disc 63. The ledge 62 is supported by circumferentially spaced ribs 64, whereby vapor may freely pass about the same. Below the disc 63 there is a semi-spherical or dome-shaped member 66 which has its periphery normally supported by another ledge 67. This ledge is likewise supported by the ribs 64. Below the member 66 there is a weight 68, which is attached to the center of the member 66 by the rod or stem 69. The arrangement is such that when the cover is tilted to an angle of about 30° or more from the horizontal, the weight 68 causes the member 66 to tilt, and thus cam the member 63 upwardly against the downwardly spaced seat 58. This is illustrated in Figure 3. The member 66 will likewise urge the disc 63 toward closed position upon the seats 58 for angles extending beyond 30° to full inversion of the tank.

In addition to the venting means just described, it is desirable to provide means for relieving abnormal vacuum conditions within the tank. Thus the cover is provided with another opening 71 which is surrounded by the downwardly faced valve seat 72. The valve disc 73 is adapted to engage the seat 72, and is carried by the lower end of the slidably mounted stem 74. A compression spring 76 urges the stem 74 upwardly to normally urge the disc 73 into sealed relation to the seat 72. Under conditions of abnormal vacuum the pressure differential upon the valve disc 73 moves the same to open position, thus permitting entrance of atmosphere into the tank.

Operation of the assembly described above is as follows: As previously stated, the body 10 is mounted in the upper wall 11 of a tank, as by welding. By swinging the handle 36 to raised position, and by turning the locking rod 31 as previously described, the cover can be unlocked or disengaged with respect to the body and swung to an open position for filling operations or for access to the interior of the tank. When the cover is closed and locked by turning the rod 31, the spring 18 is automatically tensioned to yieldably urge the cover against the cooperating seat 17. In the event an abnormal internal pressure develops, vapor can escape through the opening 56 and about the valve disc 59. If a sudden extreme pressure should develop within the tank, due for example to an internal explosion, the entire cover is forced away from the seat against the tension of the leaf spring 18. Such movement of the cover away from the seat is made possible by sliding of the cover upon the rod 31, with the rod remaining substantially stationary because of engagement between the cam 38 and the roller 41.

If the tank should tilt to an angle of 30° or more, the vent opening 56 is automatically closed by the action of the member 66 and the weight 68, as previously described. This action occurs in the same manner irrespective of the direction of the tilt, and irrespective of the extent of the tilt beyond 30°.

If the tank should turn completely over, to press the assembly against the ground, the possibility of complete mechanical failure is minimized because the working parts are well protected. The handle 36 is flush within the outer contour of the cover and this is likewise the case with the disc 59 and 73, and the parts associated with the same. Likewise the fact the spring 18 and the parts associated with the same are located within rather than exterior to the tank.

During opening movement of the handle 36, and after the handle has been turned say 90°, the ridge 39b imposes a pause during which any tank pressure is relieved, and after which the handle is further turned to unlocked position.

I claim:

1. In an assembly for mounting in one wall of a tank to form a filler dome, a body having an opening therethrough and adapted to be mounted in a tank wall, said body being formed to provide a seating surface surrounding said opening, a closure adapted to seat upon said body to establish a seal with respect to the seating surface, a leaf spring disposed upon the inner side of the cover, means for pivotally mounting one end of the leaf spring on one side portion of the body, means forming an attachment between an intermediate portion of the spring and the cover, the spring extending generally across the inner side of the cover, means including a member carried by the cover adjacent that side of the body which is remote from said pivotal mounting for releasably securing the cover in closed position, said last member being manually movable between cover securing and cover release positions, and serving to tension said spring to yieldably urge the cover against said seat responsive to movement of said member from cover release to cover securing position.

2. In an assembly for mounting in one wall of a tank to form a filler dome, a body having an opening therethrough and adapted to be mounted in a tank wall, said body being formed to provide a stationary seating surface around said opening, a closure adapted to seat upon said body to establish a seal with respect to the seating surface, a leaf spring, means for pivotally mounting one end of the leaf spring on one side portion of the body, means forming an attachment between an intermediate portion of the spring and the cover, the spring extending generally across the inner side of the cover, means including a member carried by the cover adjacent that side of the body which is remote from said pivotal mounting for releasably securing the cover in closed position, said last named member being manually movable between cover securing and cover release positions, said last means including a cam carried by said manually movable member and adapted to engage a cooperating cam element carried by the body, and means including said cam serving to tension such spring to yieldably urge the cover against the body responsive to movement of said manually operable member from cover release to cover securing position.

3. In an assembly for mounting in one wall of a tank to form a filler dome, a body having an opening therethrough adapted to be mounted in a tank wall, said body being formed to provide a stationary seating surface surrounding said opening, a closure adapted to seat upon said body to establish a seal with respect to the seating surface, a leaf spring, means for pivotally mounting one end of the leaf spring on one side portion of the body, means forming a connection between an intermediate portion of the spring and the cover, the leaf spring extending generally across the inner side of the cover, a rod rotatably and slidably carried by the cover and extending from the outer to the inner side thereof, a handle attached to the outer end of said rod to manually turn the same, a cam mounted upon the inner end of said rod, an element mounted upon the body and cooperating with said cam whereby said cover is locked in closed position responsive to turning said rod in one direction, and a thrust transmitting connection between the inner end of said rod and the free end of said leaf spring, whereby when said rod and said cam are turned to force the cover in closed position with respect to the body, said leaf spring is tensioned to yieldably urge the cover against the body.

4. An assembly as in claim 3 together with means for releasably locking said rod against rotation, said means being disengaged upon moving the cover to closed position with respect to the body.

References Cited in the file of this patent

UNITED STATES PATENTS

| | | |
|---|---|---|
| 1,682,039 | Feagles | Aug. 28, 1928 |
| 1,923,506 | Raines | Aug. 22, 1933 |
| 2,263,843 | Gross | Nov. 25, 1941 |
| 2,334,012 | Koch et al. | Nov. 9, 1943 |